(12) United States Patent
Nataraj et al.

(10) Patent No.: US 6,214,066 B1
(45) Date of Patent: *Apr. 10, 2001

(54) SYNTHESIS GAS PRODUCTION BY ION TRANSPORT MEMBRANES

(75) Inventors: Shankar Nataraj; Steven Lee Russek, both of Allentown, PA (US)

(73) Assignee: Air Products and Chemicals, Inc., Allentown, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/368,157

(22) Filed: Aug. 4, 1999

Related U.S. Application Data

(63) Continuation of application No. 08/870,012, filed on Jun. 6, 1997, now Pat. No. 6,077,323.

(51) Int. Cl.[7] .................................................. C01B 3/34
(52) U.S. Cl. .................... 48/198.2; 48/127.5; 48/198.1; 95/45; 95/54; 422/239; 423/245.3; 423/418.2; 423/651
(58) Field of Search .............................. 48/197 R, 127.7, 48/198.1, 198.3; 205/334, 338; 95/54, 45; 252/373; 423/650, 651, 652, 655, 656, 418.2, 245.3; 422/198, 193, 207, 235, 239

(56) References Cited

U.S. PATENT DOCUMENTS

| | | | |
|---|---|---|---|
| 4,791,079 | 12/1988 | Hazbun | 502/4 |
| 4,793,924 | 12/1988 | Mazanec et al. | 205/334 |
| 4,802,958 | 2/1989 | Mazanec et al. | 205/338 |
| 4,933,054 | 6/1990 | Mazanec et al. | 205/338 |
| 5,068,058 | 11/1991 | Bushinsky et al. | 252/376 |
| 5,160,713 | 11/1992 | Mazanec et al. | 423/210 |
| 5,169,415 | * 12/1992 | Roettger et al. | 95/54 |

(List continued on next page.)

FOREIGN PATENT DOCUMENTS

| | | | |
|---|---|---|---|
| 0399833 | 11/1990 | (EP) | B01D/71/02 |
| 0438902 | 4/1991 | (EP) | H01M/8/12 |
| 0673675 | 9/1995 | (EP) | B01D/71/02 |
| 0682379 | 11/1995 | (EP) | H01M/8/24 |
| 0705790 | 4/1996 | (EP) | C01B/13/02 |
| 0732138 | 9/1996 | (EP) . | |
| 0766330 | 4/1997 | (EP) | H01M/8/12 |
| WO9424065 | 10/1994 | (WO) | C04B/35/00 |

OTHER PUBLICATIONS

Ten Elshof, J. E. et al., "Oxidative Coupling of Methane in a Mixed–Conducting Perovskite Membrane Reactor". *Applied Catalysis A: General* 130 (1995) 195–212.

Mazanec, T. J. et al., "Electropox: BP's Novel Oxidation Technology", The Role of Oxygen in Improving Chemical Processes, R. Soc. Chem. (1993), vol. 132, pp. 212–225.

Mazanec, T. J. et al., "Electrocatalytic Cells for Chemical Reaction", *Solid State Ionics,* 53–56 (1992) 111–118 North Holland.

Mazanec, T. J., Electropox: BP's Novel Oxidation Technology, The Activation of Dioxygen and Homogeneous Catalytic Oxidation, Edited by D. H. R. Barton et al., Plenum Press, New York 1993, pp 85–96.

(List continued on next page.)

*Primary Examiner*—Hien Tran
*Assistant Examiner*—Basia Ridley
(74) *Attorney, Agent, or Firm*—John M. Fernbacher

(57) ABSTRACT

Synthesis gas is produced from a methane-containing reactant gas in a mixed conducting membrane reactor in which the reactor is operated to maintain the product gas outlet temperature above the reactant gas feed temperature wherein the total gas pressure on the oxidant side of the membrane is less than the total gas pressure on the reactant side of the membrane. Preferably, the reactant gas feed temperature is below a maximum threshold temperature of about 1400° F. (760° C.), and typically is between about 950° F. (510° C.) and about 1400° F. (760° C.). The maximum temperature on the reactant side of the membrane reactor is greater than about 1500° F. (815° C.).

1 Claim, 6 Drawing Sheets

U.S. PATENT DOCUMENTS

| | | | |
|---|---|---|---|
| 5,240,480 | * 8/1993 | Thorogood et al. | 96/4 |
| 5,276,237 | 1/1994 | Mieville | 585/500 |
| 5,306,411 | 4/1994 | Mazanec et al. | 204/265 |
| 5,356,728 | 10/1994 | Balachandran et al. | 429/8 |
| 5,364,506 | 11/1994 | Gur et al. | 205/334 |
| 5,534,471 | 7/1996 | Carolan et al. | 502/4 |
| 5,573,737 | 11/1996 | Balachandran et al. | 422/211 |
| 5,580,497 | 12/1996 | Balachandran et al. | 252/519.1 |
| 5,591,315 | 1/1997 | Mezanec et al. | 205/462 |
| 5,599,383 | 2/1997 | Dyer et al. | 96/8 |
| 5,714,091 | * 2/1998 | Mazanec et al. | 252/373 |
| 5,846,641 | 12/1998 | Abeles et al. | 428/312.8 |
| 5,868,918 | 2/1999 | Adler et al. | 205/615 |
| 6,048,472 | * 4/2000 | Nataraj et al. | 252/373 |
| 6,077,323 | * 6/2000 | Nataraj et al. | 48/198.1 |

OTHER PUBLICATIONS

Mazanec, T. J., "Prospects for Ceramic Electrochemical Reactors in Industry", *Solid State Ionics,* 70/71 (1994) 11–19, North Holland.

Mazanec, T. J., "Electropox Gas Reforming", Electrochemical Society Proceedings, vol. 95–24, 1997, pp 16–28.

Balachandran, U. et al., "Development of a Ceramic Membrane for Upgrading Methane to High–value–Added Clean Fuels", Prepr. Pap. —Am. Chem. Soc., Div. Fuel Chem. (1997), 42(2), 591–595.

Balachandran, U. et al., "Dense Ceramic Membranes for Converting Methane to Syngas", Electrochemical Society Proceedings (1997), vol. 95–24, pp 29–36.

Balachandran, U. et al., "Mixed–Conducting Ceramic Membranes for Partial Oxygenation of Methane", Ceram. Trans. (1996) 65(Role of Ceramics in Advanced Electrochemical Systems), 23–35.

Schwartz, M. et al., "The Use of Ceramic Membrane Reactors for The Partial Oxidation of Methane to Synthesis Gas", Prepr. Pap.—Am. Chem. Soc, Div. Fuel chem. (1997), 42(2) 596–600.

Rostrup–Nielsen, J. et al., "Steam Reforming–Opportunities and Limits of the Technology", presented at the Nato ASI Study on Chemical Reactor Technology for Environmentally Safe Reactors and Predictors, Aug. 25–Sep. 5, 1991, Ontario, Canada.

Christiansen, T. S. et al. "Improve Syngas Production Using Autothermal Reforming", *Hydrocarbon Processing,* Mar. 1994, pp. 39–46.

Sundset, T. et al., "Evaluation of Natural Gas Based Synthesis Gas Production Technologies", *Catalysis Today* 21 (1994), pp. 269–278.

Reed, C. L. et al. "Production of Synthesis Gas by Partial Oxidation of Hydrocarbons" presented at the $86^{th}$ AIChE meeting, Houston, Texas, Apr. 1–5, 1979.

Fong, F., "Texaco's HyTEX Process for High Pressure Hydrogen Production", presented at the KTI Symposium, Apr. 27, 1993, Caracas, Venezuela.

Osterrieth, P. J. et al., "Custom–Made Synthesis Gas Using Texaco's Partial Oxidation Technology", presented at the AIChE Spring National Meeting, New Orleans, LA, Mar. 9, 1988.

Balachandran, U. et al. "Ceramic Membranes For Methane Conversion", presented at the Coal Liquefaction and Gas Conversion Contractors, Review Conference, Sep. 7–8, 1994, Pittsburgh, PA.

Tsai, C.–Y. et al., "Simulation of a Nonisothermal Catalytic Membrane Reactor for Methane partial Oxidation to Syngas", Proceedings of the Third International Conference of Inorganic Membranes, Worcester, MA, Jul. 10–14, 1994.

Tsai, C.–Y. et al., "Modeling and Simulation of a Nonisothermal Catalytic Membrane Reactor", *Chem. Eng Comm.,* 1995, vol. 134, pp. 107–132.

Tsai, C. Y., "Perovskite Dense Membrane Reactors for the Partial Oxidation of Methane to Synthesis Gas", May 1996 (published by UMI Dissertation Services).

Ma. Y. H., et al., "The Partial Oxidation of Methane to Synthesis Gas by Oxygen Selective Dense Perovskite Membrane Reactors", Presented at the AIChE 1997 Spring National Meeting, Houston, TX—Mar. 9–13, 1997.

Schwartz, M., et al., "The Use of Ceramic Membrane Reactors for the Partial Oxidation of Methane to Synthesis Gas", Presented at the AIChE 1997 Spring national Meeting, Houston, TX—Mar. 9–13, 1997.

Udovich, C. A., et al., "Ceramic Membrane Reactor for the Partial Oxygenation of Methane to Synthesis Gas", Presented at the AIChE 1997 Spring National Meeting, Houston, TX—Mar. 9–13, 1997.

\* cited by examiner

SYNTHESIS GAS PRODUCTION BY ION TRANSPORT MEMBRANES

CROSS-REFERENCE TO RELATED APPLICATIONS

This application is a continuation of application Ser. No. 08/870,012, filed on Jun. 6, 1997, now U.S. Pat. No. 6,077,323, which issued on Jun. 20, 2000.

STATEMENT REGARDING FEDERALLY SPONSORED RESEARCH OR DEVELOPMENT

Not applicable.

BACKGROUND OF THE INVENTION

Synthesis gas containing hydrogen and carbon oxides is an important feedstock for the production of a wide range of chemical products. Synthesis gas mixtures with the proper ratios of hydrogen to carbon monoxide are reacted catalytically to produce liquid hydrocarbons and oxygenated organic compounds including methanol, acetic acid, dimethyl ether, oxo alcohols, and isocyanates. High purity hydrogen and carbon monoxide are recovered by further processing and separation of synthesis gas. The cost of generating the synthesis gas usually is the largest part of the total cost of these products.

Two major reaction routes are used for synthesis gas production—the steam reforming of light hydrocarbons, primarily natural gas, naphtha, and refinery offgases, and the partial oxidation of carbon-containing feedstocks ranging from natural gas to high molecular weight liquid or solid carbonaceous materials. Autothermal reforming is an alternative process using light hydrocarbon feed which combines features of both partial oxidation and steam reforming in a single reactor. In the various versions of this process, feed gas is partially oxidized in a specially-designed burner and the resulting hot gas passes through a catalyst bed where steam reforming occurs. Newer synthesis gas generation processes include various heat exchange reformers such as gas heated reforming (GHR) developed by ICI, the SMART reformer by KTI, and the CAR reformer by UHDE; the improved Texaco gasification process (TGP) included in their HyTEX™ hydrogen production system; Haldor Topsoe's HERMES process; the Shell gasification process (SGP); Exxon's fluidized bed synthesis gas process; and Kellogg's KRES process.

The state of the art in commercial synthesis gas generation technology is summarized in representative survey articles including "Steam Reforming—Opportunities and Limits of the Technology" by J. Rostrup-Nielsen et al, presented at the NATO ASI Study on Chemical Reactor Technology for Environmentally Safe Reactors and Predictors, Aug. 25–Sep. 5, 1991, Ontario, Canada; "Improve Syngas Production Using Autothermal Reforming" by T. S. Christiansen et al, *Hydrocarbon Processing*, March 1994, pp. 39–46; "Evaluation of Natural Gas Based Synthesis Gas Production Technologies" by T. Sundset et al, *Catalysis Today*, 21 (1994), pp. 269–278; "Production of Synthesis Gas by Partial Oxidation of Hydrocarbons" by C. L. Reed et al, presented at the 86th National AIChE meeting, Houston, Tex., Apr. 1–5, 1979; "Texaco's HYTEX™ Process for High Pressure Hydrogen Production" by F. Fong, presented at the KTI Symposium, Apr. 27, 1993, Caracas, Venezuela; and "Custom-Made Synthesis Gas Using Texaco's Partial Oxidation Technology" by P. J. Osterrieth et al, presented at the AIChE Spring National Meeting, New Orleans, La., Mar. 9, 1988.

In the commercial partial oxidation processes described above, oxygen is required and is typically supplied at purifies of 95 to 99.9 vol %. Oxygen is obtained by the separation of air using known methods, usually the low-temperature distillation of air for larger volumes and pressure swing adsorption for smaller volumes.

An alternative technology for synthesis gas production is in the early stages of development in which oxygen for the partial oxidation reactions is provided in situ by the separation of air at high temperatures using ceramic, ceramic-metal, or ceramic-ceramic composite membranes which conduct both electronic species and oxygen ions. These membranes are part of a class of membranes known generically as ion transport membranes, and are in a specific class of ion transport membranes which conduct both electronic species and oxygen ions known collectively as mixed conducting membranes. These membranes can be used in combination with appropriate catalysts to produce synthesis gas in a membrane reactor without the need for a separate oxygen production step. The reactor is characterized by one or more reaction zones wherein each zone comprises a mixed conducting membrane which separates the zone into an oxidant side and a reactant side.

An oxygen-containing gas mixture, typically air, is contacted with the oxidant side of the membrane and oxygen gas dissociates to form oxygen ions which diffuse through the membrane material. A reactant gas containing methane and other low molecular weight hydrocarbons, typically natural gas with optional steam addition, flows across the reactant side of the membrane. Oxygen on the reactant side of the membrane reacts with components in the reactant gas to form synthesis gas containing hydrogen and carbon monoxide. A catalyst to promote the transfer of oxygen into the membrane can be applied to the surface of the membrane on the oxidant side. A catalyst to promote the conversion of reactant gas components to synthesis gas may be applied to the surface of the reactant side of the membrane; alternatively, a granular form of the catalyst may be placed adjacent to the membrane surface. Catalysts which promote the conversion of hydrocarbons, steam, and carbon dioxide to synthesis gas are well-known in the art.

Numerous reactors and compositions of mixed conducting membranes suitable for this purpose have been disclosed in the art. Membrane reactors and methods of operating such reactors for the selective oxidation of hydrocarbons are disclosed in related U.S. Pat. Nos. 5,306,411 and 5,591,315. Ceramic membranes with wide ranges of compositions are described which promote the transfer of oxygen from an oxygen-containing gas and reaction of the transferred oxygen with a methane-containing gas to form synthesis gas. Mixed conductors having a single phase perovskite structure are utilized for the membrane material; alternatively multiphase solids are used as dual conductors wherein one phase conducts oxygen ions and another conducts electronic species. A membrane reactor to produce synthesis gas is disclosed which operates at a temperature in the range of 1000 to 1400° C., wherein the reactor may be heated to the desired temperature and the temperature maintained during reaction by external heating and/or exothermic heat from the chemical reactions which occur. In one general embodiment, It is disclosed that the process is conducted at temperatures within the range of 1000 to 1300° C. Experimental results are reported for oxygen flux and synthesis gas production in an isothermal laboratory reactor using a dual-conductor membrane at a constant temperature of 1100° C. Inert diluents such as nitrogen, argon, helium, and other gases may be present in the reactor feed and do not interfere with the desired chemical reactions. Steam if present in the reactor feed is stated to be an inert gas or diluent.

In a paper entitled "Ceramic Membranes for Methane Conversion" presented at the Coal Liquefaction and Gas Conversion Contractors, Review Conference, Sep. 7–8, 1994, Pittsburgh, Pa., U. Balachandran et al describe the fabrication of long tubes of Sr—Co$_{0.5}$—Fe—O$_x$ membranes and the operation of these tubes for conversion of methane to synthesis gas in laboratory reactors at 850° C.

U.S. Pat. No. 4,793,904 discloses the use of a solid electrolyte membrane with conductive coatings on both sides which are optionally connected by an external circuit. The membrane is used in an electrolytic cell at temperatures in the range of 1050 to 1300° C. to convert methane to synthesis gas at a pressure of about 0.1 to about 100 atmospheres. Experimental results are presented for the conversion of methane to synthesis gas components in a reactor cell with an yttria-stabilized zirconia membrane having platinum electrodes optionally using an external electrical circuit. The reactor cell was operated isothermally at a temperature of 800, 1000, or 1100° C.

Related U.S. Pat. Nos. 5,356,728 and 5,580,497 disclose cross-flow electrochemical reactor cells and the operation of these cells to produce synthesis gas from methane and other light hydrocarbons. Mixed conducting membranes made of mixed oxide materials with perovskite or non-perovskite structures are disclosed for use in the crossflow reactor cells. The production of synthesis gas by the partial oxidation of hydrocarbons is disclosed using reactor temperatures of about 1000 to 1400° C. or alternatively in the range of about 450 to 1250° C. Experimental results are reported for synthesis gas production in isothermal tubular laboratory reactors at constant temperatures in the range of 450 to 850° C. A pressure in the ceramic tube reactor, typically about 6 inches of water head, was maintained by means of a downstream water bubbler.

U.S. Pat. No. 5,276,237 discloses the partial oxidation of methane to synthesis gas using a mixed metal oxide membrane comprising alumina with multivalent activator metals such as yttrium and barium. A process concept is disclosed with low oxygen recovery to facilitate heat removal and maintain a high oxygen partial pressure driving force. The partial oxidation reactions were carried out at a temperature in the range of about 500 to about 1200° C., and the temperature on the oxygen side of the membrane is described to be at most only a few degrees less than the reaction temperature on the reactant side of the membrane.

The practical application of mixed conducting membranes to produce synthesis gas will utilize reactor modules having a plurality of individual membranes with appropriate inlet and outlet flow manifolds to transport feed and product gas streams. Such modules provide the large membrane surface area required to produce commercial volumes of synthesis gas product. A number of membrane module designs have been disclosed in the art which address this requirement. Previously-cited U.S. Pat. Nos. 5,356,728 and 5,580,497 describe one type of crossflow membrane reactor which has hollow ceramic blades positioned across a gas stream flow or a stack of crossed hollow ceramic blades containing channels for gas flow. Alternatively, the crossflow reactor can be fabricated in the form of a monolithic core with appropriate inlet and outlet manifolding. U.S. Pat. No. 4,791,079 discloses membrane module designs for mixed conducting membrane reactors for the oxidative coupling of methane to produce higher hydrocarbons, hydrogen, and carbon oxides.

A planar membrane module is described in European Patent Publication EP 0 732 138 A2 which contains a plurality of planar units each of which comprises a channel-free porous support with an outer layer of mixed conducting oxide material. An oxygen-containing gas is passed through the porous supports and permeated oxygen reacts with light hydrocarbons at the outer layer of the mixed conducting oxide material. The module is heated to a temperature ranging from about 300 to 1200° C. for continuous production of synthesis gas. U.S. Pat. No. 5,599,383 discloses a tubular solid state membrane module having a plurality of mixed conducting tubes each of which contains inner porous material which supports the tube walls and allows gas flow within the tube. The module can be used to produce synthesis gas wherein an oxygen-containing gas is passed through the inside of the tubes and a hydrocarbon-containing gas is passed over the outside of the tubes. The module is heated to a temperature ranging from 300 to 1200° C., the oxygen-containing gas is passed through the tubes, and the hydrocarbon-containing gas is passed over the outside of the tubes. Oxygen diffuses through the mixed conducting tube walls and reacts with the hydrocarbon under controlled conditions to produce synthesis gas containing hydrogen and carbon monoxide. A catalyst to promote the formation of synthesis gas may be applied to the outer surface of the tubes.

The background art summarized above characterizes the temperatures and pressures in mixed conducting membrane reactors for synthesis gas production in general non-spatial terms, that is, differences in temperature and pressure as a function of reactor geometry are not considered. All of the above disclosures teach the operation of reactors at a single temperature, i.e., as isothermal reactors, particularly for laboratory-scale reactors. In some cases, general temperature ranges are disclosed for reactor operation, but no information is offered regarding how the temperature varies with reactor geometry. In all cases, gas pressures are reported as single pressures independent of geometry, and no pressure differences between the oxidant (air) side and the hydrocarbon (fuel) side are disclosed.

C.-Y. Tsai et al describe a nonisothermal, two-dimensional computational model of a mixed conducting membrane reactor using a perovskite membrane for the partial oxidation of methane to synthesis gas. This work is presented in related publications entitled "Simulation of a Nonisothermal Catalytic Membrane Reactor for Methane Partial Oxidation to Syngas" in the Proceedings of the Third International Conference on Inorganic Membranes, Worcester Mass., Jul. 11–14, 1994, and "Modeling and Simulation of a Nonisothermal Catalytic Membrane Reactor" in *Chem. Eng Comm.*, 1995, Vol. 134, pp. 107–132. The simulation describes the effects of gas flow rate, reactor length, and membrane thickness on methane conversion and synthesis gas selectivity for a tubular reactor configuration with air on the shell side. Temperature profiles as a function of axial reactor position are also presented. Key parameters are held constant for all simulation cases; in particular, the pressure for both shell and tube sides of the reactor is specified at 1 atm and the inlet temperature is specified at 800° C. Additional discussion of experimental and computational work on topics in these two publications is presented in the doctoral thesis by C.-Y. Tsai entitled "Perovskite Dense Membrane Reactors for the Partial Oxidation of Methane to Synthesis Gas", May 1996, Worcester Polytechnic Institute (available through UMI Dissertation Services).

The practical application of mixed conducting membranes to produce synthesis gas requires reactor modules with a plurality of individual membranes having appropriate inlet and outlet flow manifolds to transport feed and product gas streams. The successful operation of such reactor modules will require the careful selection and control of inlet, intermediate, and outlet gas temperatures, since these temperatures will affect both the chemical reactions which occur in the reactor and the mechanical integrity of the reactor assembly. In addition, the gas pressures within the reactor will affect product distribution, reactor integrity, gas compression equipment, and power requirements; therefore the gas pressures must be specified carefully in the design and operation of reactor modules. The prior art to date has not addressed these important design and operating issues. Synthesis gas production using mixed conducting membrane reactors also will involve the integration of reactor modules with feed gas supply systems and with product gas treatment and separation systems. The integration of mixed conducting membrane reactors into overall process designs for synthesis gas production likewise has not been addressed in the prior art.

The successful design and operation of synthesis gas production systems which utilize mixed conducting membrane reactors must include the specification of temperatures and pressures within the reactors and also the integration of the reactors with upstream and downstream gas processing systems. The invention described below and defined in the claims which follow addresses these practical design and operating requirements for synthesis gas production in membrane reaction systems.

BRIEF SUMMARY OF THE INVENTION

The invention is a method for the production of synthesis gas containing hydrogen and carbon monoxide which comprises:

(a) providing a reaction zone having an oxidant side and a reactant side which are separated by a solid mixed conducting membrane;

(b) heating an oxygen-containing oxidant gas feed and introducing the resulting heated oxidant gas feed into the oxidant side of the reaction zone at an oxidant gas feed temperature and an oxidant gas feed pressure;

(c) heating a methane-containing reactant gas and introducing the resulting heated reactant gas feed into the reactant side of the reaction zone at a reactant gas feed temperature and a reactant gas feed pressure;

(d) permeating oxygen from the oxidant side of the reaction zone through the mixed conducting membrane to the reactant side of the reaction zone and reacting the oxygen with the methane-containing reactant gas to form at least hydrogen and carbon monoxide;

(e) withdrawing a synthesis gas product comprising at least hydrogen and carbon monoxide from the reactant side of the reaction zone at a product gas outlet temperature; and (f) maintaining the reactant gas feed temperature at between about 950° F. (510° C.) and about 1400° F. (760° C.) and the product gas outlet temperature at greater than about 1500° F. (815° C.).

Preferably the total pressure at any point in the reactant side of the reaction zone is greater than the total pressure at any point in the oxidant side of the reaction zone, and the oxidant gas feed pressure is between about 1 and about 45 psig (0.069 to 3.1 barg). The reactant gas feed pressure typically is between about 100 and 900 psig (6.9 to 62 barg), and the oxidant gas feed temperature may be up to about 200° F. (111° C.) greater than the reactant gas feed temperature.

Oxygen-depleted oxidant gas is withdrawn from the oxidant side of the reaction zone at an oxygen-depleted oxidant gas temperature which is equal to or less than the product gas outlet temperature, and the oxidant gas feed temperature is less than the oxygen-depleted oxidant gas temperature. Preferably at least about 90% of the oxygen in the heated oxidant gas feed to the oxidant side of the reaction zone permeates the mixed conducting membrane. If desired, a catalyst may be utilized in the reactant side of the reaction zone to promote the formation of hydrogen and carbon monoxide.

The methane-containing reactant gas additionally may comprise one or more components selected from the group consisting of water, carbon dioxide, and hydrogen. Preferably the methane-containing reactant gas contains water, and the water to carbon molar ratio preferably is between about 0.5 to about 5, the water to carbon molar ratio being defined as the number of molecules of water in the reactant gas divided by the total number of carbon atoms present in the hydrocarbons and carbon monoxide in the reactant gas.

In an alterative embodiment, the invention is a method for the production of synthesis gas containing hydrogen and carbon monoxide comprising:

(a) providing a reaction zone having an oxidant side and a reactant side which are separated by a solid mixed conducting membrane;

(b) heating an oxygen-containing oxidant gas and introducing the resulting heated oxidant gas feed into the oxidant side of the reaction zone at an oxidant gas feed temperature and an oxidant gas feed pressure;

(c) heating a methane-containing reactant gas and introducing the resulting heated reactant gas feed into the reactant side of the reaction zone at a reactant gas feed temperature and a reactant gas feed pressure;

(d) permeating oxygen from the oxidant side of the reaction zone through the mixed conducting membrane to the reactant side of the reaction zone and reacting the oxygen with the methane-containing reactant gas to form at least hydrogen and carbon monoxide;

(e) withdrawing a synthesis gas product comprising at least hydrogen and carbon monoxide from the reactant side of the reaction zone at a product gas outlet temperature;

(f) withdrawing an oxygen-depleted oxidant gas from the outlet of the oxidant side of the reaction zone; and (g) providing at least a portion of the heat for heating the oxygen-containing oxidant gas in step (b), or for heating the methane-containing reactant gas in step (c), or for heating both the oxygen-containing oxidant gas in step (b) and the methane-containing reactant gas in step (c), by indirect heat exchange with the oxygen-depleted oxidant gas from the reaction zone.

Preferably the product gas outlet temperature is greater than the reactant gas feed temperature. The oxygen-containing oxidant gas in step (b) may be heated by direct combustion with a fuel in a direct-fired combustor to produce a hot, pressurized combustion product which provides the heated oxidant gas feed. The oxygen-containing oxidant gas optionally is heated by indirect heat exchange with oxygen-depleted oxidant gas from the reaction zone.

The total pressure at any point in the reactant side of the reaction zone preferably is greater than the total pressure at any point in the oxidant side of the reaction zone. Typically the pressure of the oxidant gas feed is between about 1 and about 45 psig (0.069 to 3.1 barg) and the pressure of the reactant gas feed is between about 100 and 900 psig (6.9 to 62 barg).

The reactant gas feed temperature should be between about 950° F. (510° C.) and about 1400° F. (760° C.), and the product outlet temperature preferably is above about 1500° F. (815° C.). The oxidant gas feed temperature may be up to about 200° F. (111° C.) greater than the reactant gas feed temperature and the oxygen-depleted oxidant gas temperature may be equal to or less than the product gas outlet temperature. The oxidant gas feed temperature typically is less than the oxygen-depleted oxidant gas temperature, and preferably at least about 90% of the oxygen in the oxygen-containing oxidant gas permeates the oxygen-permeable membrane. A catalyst may be utilized in the reactant side of the reaction zone to promote the formation of hydrogen and carbon monoxide. The synthesis gas product withdrawn from the reactant side of the reaction zone may be cooled to a temperature below about 800° F. (427° C.).

The methane-containing reactant gas may include one or more components selected from the group consisting of water, carbon dioxide, and hydrogen. Preferably the methane-containing reactant gas contains water, and the water to carbon molar ratio is between about 0.5 to about 5, the water to carbon molar ratio being defined as the number of molecules of water in the reactant gas divided by the total number of carbon atoms present in the hydrocarbons and carbon monoxide in the reactant gas.

If desired, the synthesis gas product withdrawn from the outlet of the oxidant side of the reaction zone is quenched by direct contact with liquid water to reduce the gas product temperature to below the dew point of the resulting gas mixture, and a hot water stream is separated from uncondensed synthesis gas components. The methane-containing reactant gas may be obtained by contacting a methane-containing feed gas with this hot water stream or any other heated water stream, thereby introducing water into the methane-containing reactant gas.

The synthesis gas product typically contains carbon dioxide, and the synthesis gas product can be cooled, dewatered, and at least a portion of the carbon dioxide removed therefrom. At least a portion of the resulting removed carbon dioxide cana be introduced into the methane-containing reactant gas prior to the reactant side of the reaction zone.

At least a portion of the synthesis gas product optionally is separated to yield a hydrogen-enriched gas stream and a waste gas stream, and at least a portion of the hydrogen-enriched gas stream is introduced into the methane-containing reactant gas prior to the reactant side of the reaction zone. The oxygen-containing oxidant gas may be heated at least in part prior to the reaction zone by direct combustion with at least a portion of the waste gas stream as a fuel in a direct-fired combustor to produce a hot, pressurized combustion product which provides the heated oxidant gas feed.

In the most general embodiment of the invention, synthesis gas containing hydrogen and carbon monoxide is produced by a method which comprises:

(a) providing a reaction zone having an oxidant side and a reactant side which are separated by a solid mixed conducting membrane;

(b) heating an oxygen-containing oxidant gas feed and introducing the resulting heated oxidant gas feed into the oxidant side of the reaction zone at an oxidant gas feed temperature and an oxidant gas feed pressure;

(c) heating a methane-containing reactant gas and introducing the resulting heated reactant gas feed into the reactant side of the reaction zone at a reactant gas feed temperature and a reactant gas feed pressure;

(d) permeating oxygen from the oxidant side of the reaction zone through the mixed conducting membrane to the reactant side of the reaction zone and reacting the oxygen with the methane-containing reactant gas to form at least hydrogen and carbon monoxide;

(e) withdrawing a synthesis gas product comprising at least hydrogen and carbon monoxide from the reactant side of the reaction zone at a product gas outlet temperature; and (f) maintaining the product gas outlet temperature above the reactant gas feed temperature;

wherein the total pressure at any point in the reactant side of the reaction zone is greater than the total pressure at any point in the oxidant side of the reaction zone.

DETAILED DESCRIPTION OF THE INVENTION

The present invention defines processes and methods of operation for a mixed conducting membrane reactor module for the production of synthesis gas by the controlled reaction of hydrocarbons with oxygen wherein the oxygen is provided in situ by permeation from an oxygen-containing gas through the mixed conducting membrane. The reactor module is integrated with process steps for the supply of reactants (in one embodiment, air and natural gas) and process steps for the withdrawal and further treatment of the reactor effluent streams (in one embodiment, synthesis gas and oxygen-depleted air). Preferred operating conditions are defined for feed gas and product gas temperatures and for the pressure differential across the membrane in the reactor module. The invention defines important operating conditions which have not been addressed or considered in the prior art of high temperature mixed conducting membrane reactors.

Figure 1:
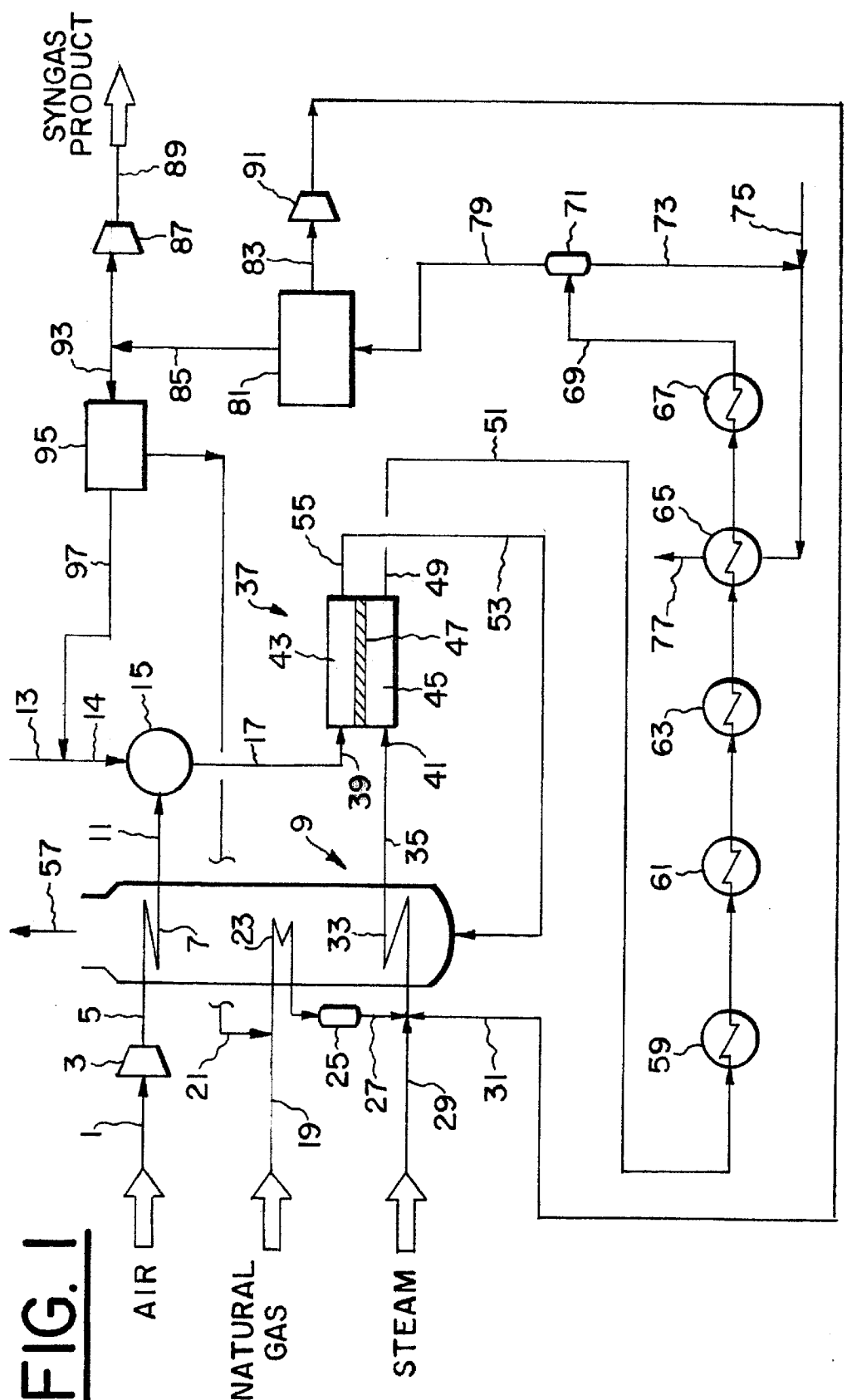
FIG. 1 is a process flow diagram of the process of the present invention.

A general embodiment of the invention is shown in FIG. 1. Oxygen-containing gas 1, preferably air, is pressurized in compressor 3 to a pressure in the range of about 1 to about 45 psig (0.069 to 3.1 barg), preferably less than about 10 psig (0.69 barg). While air is the preferred oxygen-containing gas, other oxygen-containing gases can be utilized as an oxygen source for the process. Pressurized oxygen-containing gas 5 is preheated in heat exchanger 7 in heat transfer zone 9, and preheated oxygen-containing gas 11 is heated further by direct combustion with fuel 14 in burner 15 to yield heated oxidant 17 typically containing 15–20 vol % oxygen at a temperature above 932° F. (500° C.) and preferably within ±200° F. (111° C.) of the reactant feed temperature. Burner 15 represents any type of known, commercially-available combustion device for promoting essentially complete combustion of fuel 14 in an excess oxygen environment.

The term oxygen is used herein to describe generically any form of oxygen ($O_1$ atomic number 8) present in the gas streams and reactor systems described. The generic term oxygen includes dioxygen ($O_2$), oxygen ions (for example $O_-$ or $O^=$), atomic oxygen (O—), or other forms of oxygen derived from dioxygen In the gas streams and systems described. The term oxygen as used herein does not include oxygen which is chemically bound in carbon oxides, nitrogen oxides, or other oxygen-containing compounds.

Gaseous methane-containing hydrocarbon stream 19 is obtained at a pressure of about 100–900 psig (6.9–62.1 barg), preferably 200–400 psig (13.8–27.6 barg), optionally by compression or pressure reduction (not shown) of a source gas. Methane-containing stream 19 can be a methane-containing gas from a petroleum refinery, petrochemical plant, or other industrial source, or can be natural gas obtained from a pipeline or directly from the wellhead after appropriate pretreatment. Methane-containing stream 19 can be natural gas with a typical composition in the range of at least 80 vol % methane, less than 20 vol % ethane, less than 10 vol % propane, less than 5 vol % alkanes with more than 3 carbon atoms, less than 10 vol % carbon dioxide, less than 10 vol % nitrogen, and less than 100 ppmv total sulfur.

Methane-containing stream 19 optionally is combined with a stream of hydrogen 21 and optionally heated in heat exchanger 23 in heat transfer zone 9 to a temperature up to 800° F. (427° C.). The resulting heated stream optionally is passed through desulfurization/hydrogenation reaction zone 25 containing a hydrogenation catalyst which typically comprises cobalt and molybdenum or nickel and molybdenum. In reaction zone 25, olefinic hydrocarbons are converted to paraffins and organic sulfur compounds are converted into hydrogen sulfide which is sorbed on a layer of zinc oxide in the reactor. Typically one reactor vessel containing hydrogenation catalyst is operated in series with two reactors filled with zinc oxide which are operated in parallel (not shown) with one onstream and one being regenerated. This method of removing olefins and sulfur compounds is a well-established practice in the steam-methane reforming of natural gas to prevent coking (by olefin cracking) and catalyst poisoning in the reforming reactor.

Treated methane-containing gas 27 (which may contain residual hydrogen) is optionally combined with steam 29 and/or carbon dioxide 31, and the combined stream is heated to about 950 to 1400° F. (510 to 760° C.) in heat exchanger 33 in heat transfer zone 9 to yield heated reactant 35. Preferably steam is used, and the water to carbon molar ratio is between about 0.5 to about 5, the water to carbon molar ratio being defined as the number of molecules of water in heated reactant 35 divided by the total number of carbon atoms present in the hydrocarbons and carbon monoxide in heated reactant 35.

Heated oxidant 17 and heated reactant 35 are introduced into mixed conducting membrane reaction zone 37. The gas at oxidant inlet 39 is at a temperature of at least 932° F. (500° C.) and preferably is within ±200° F. (111° C.) of the temperature of the heated reactant gas at reactant inlet 41. The gas temperature at reactant inlet 41 is in the range of about 950 to 1400° F. (510 to 760° C.).

Mixed conducting membrane reaction zone 37 is shown schematically having oxidant side 43 separated from reactant side 45 by mixed conducting membrane 47, and is presented in this simplified format for the following description of the reactor operation. Oxidant side 43 represents a reactor volume through which the oxidant gas flows and contacts the oxidant side surface of mixed conducting membrane 47. Dioxygen is ionized at this surface to form oxygen ions and the oxygen ions permeate mixed conducting membrane 47 to the reactant side surface of the membrane.

The term mixed conducting membrane as used herein defines a solid material or mixture of solid materials which simultaneously conducts both oxygen ions and electronic species (for example electrons). The mixed conducting membrane can comprise any solid material or materials known in the art which perform these simultaneous functions. Such materials are described for example in the earlier-cited U.S. Pat. No. 5,306,411 and in a paper entitled "Electropox Gas Reforming" by T. J. Mazanec in *Electrochem. Soc. Proceedings* 95–24, 16(1997).

Alternatively, the mixed conducting membrane can be a mixture of one or more ion conducting solid materials and one or more solid materials which conduct electronic species (such as electrons) wherein the mixture of solid materials forms a composite mixed conducting membrane. One example of a composite mixed conducting membrane uses zirconia as the oxygen ion conducting solid material and palladium as the conductor of electronic species. Another example of a composite mixed conducting membrane uses zirconia as the oxygen ion conducting solid material and a mixture of indium and praseodymium oxides as the conductor of electronic species.

The active mixed conducting membrane material in mixed conducting membrane 47 can be a thin layer on a planar or tubular porous support as is known in the art. The support may be fabricated from an inert material which does not conduct oxygen ions and/or electronic species at process operating conditions. Alternatively the support can be an ionically conducting material, an electronic species conducting material or a mixed conducting oxide material of the same or different composition than the active layer of mixed conducting membrane material. Preferably, the porous support is fabricated from a material having thermal expansion properties which are compatible with the mixed conducting membrane material, and the compositions making up the respective layers should be selected from materials which do not adversely chemically react with one another under process operating conditions.

The surface of mixed conducting membrane 47 in oxidizing side 43 optionally can be coated with catalytic material to promote the transfer of oxygen into the membrane. Such materials are known in the art and include metals and oxides of metals selected from Groups 2, 5, 6, 7, 8, 9, 10, 11, 15 and the F Block lanthanides of the Periodic Table of the Elements according to the International Union of Pure and Applied Chemistry. Suitable metals include platinum, palladium, ruthenium, gold, silver, bismuth, barium, vanadium, molybdenum, cerium, praseodymium, cobalt, rhodium and manganese.

Reactant side 45 represents a reactor volume through which the reactant gas flows and reacts with oxygen which has permeated through mixed conducting membrane 47. A number of chemical reactions occur in reactant side 45 among the several chemical species present including oxygen, hydrogen, water, carbon monoxide, carbon dioxide, methane, and possibly elemental carbon. The primary reactions are as follows:

$$CH_4 + 1/2\, O_2 \rightleftharpoons 2\, H_2 + CO \quad (1)$$

$$CH_4 + 3/2\, O_2 \rightleftharpoons 2 H_2O + CO \quad (2)$$

$$CH_4 + 2 O_2 \rightleftharpoons 2\, H_2O + CO_2 \quad (3)$$

$$CH_4 + H_2O \rightleftharpoons 3\, H_2 + CO \quad (4)$$

$$CH_4 + CO_2 \rightleftharpoons 2\, H_2 + 2\, CO \quad (5)$$

$$CO + H_2O \rightleftharpoons H_2 + CO_2 \quad (6)$$

$$H_2 + CO \rightleftharpoons C + H_2O \quad (7)$$

$$2\, CO \rightleftharpoons C + CO_2 \quad (8)$$

$$C_nH_m \rightleftharpoons nC + m/2\, H_2 \quad (9)$$

Reactions similar to reactions (1) to (5) above occur with heavier hydrocarbons such as ethane and propane if present.

These reactions are similar to the known reactions which occur in the conventional partial oxidation of methane to product synthesis gas. Oxidation reactions (1), (2), and (3) are shown as consuming dioxygen, which may occur in reactant side 45 of membrane reaction zone 37. In addition, other forms of oxygen as earlier described may react with methane (and other hydrocarbons) to form carbon oxides. The exact reaction mechanisms between permeated oxygen and hydrocarbons in reactant side 45 are not fully understood, but carbon monoxide and carbon dioxide are formed as reaction products. Reactions (1), (2), (3), and (6) are exothermic while reactions (4) and (5) are endothermic; the exothermic reactions (2) and (3) are kinetically very fast, require some form of oxygen, and can occur without any catalyst; while the endothermic reactions (4) and (5) are slower, and benefit from the reforming catalyst. If the local oxygen flux is too high, and the endothermic reactions cannot kinetically keep up with the exothermic reactions, the region will overheat. The local oxygen flux and the associated volume and activity of the catalyst must be matched to enable the endothermic reactions to proceed to an extent sufficient to keep the region from overheating. The catalyst must be in the proximity of the ion transport membrane on the reactant side to minimize heat and mass transfer resistance.

Figure 2:
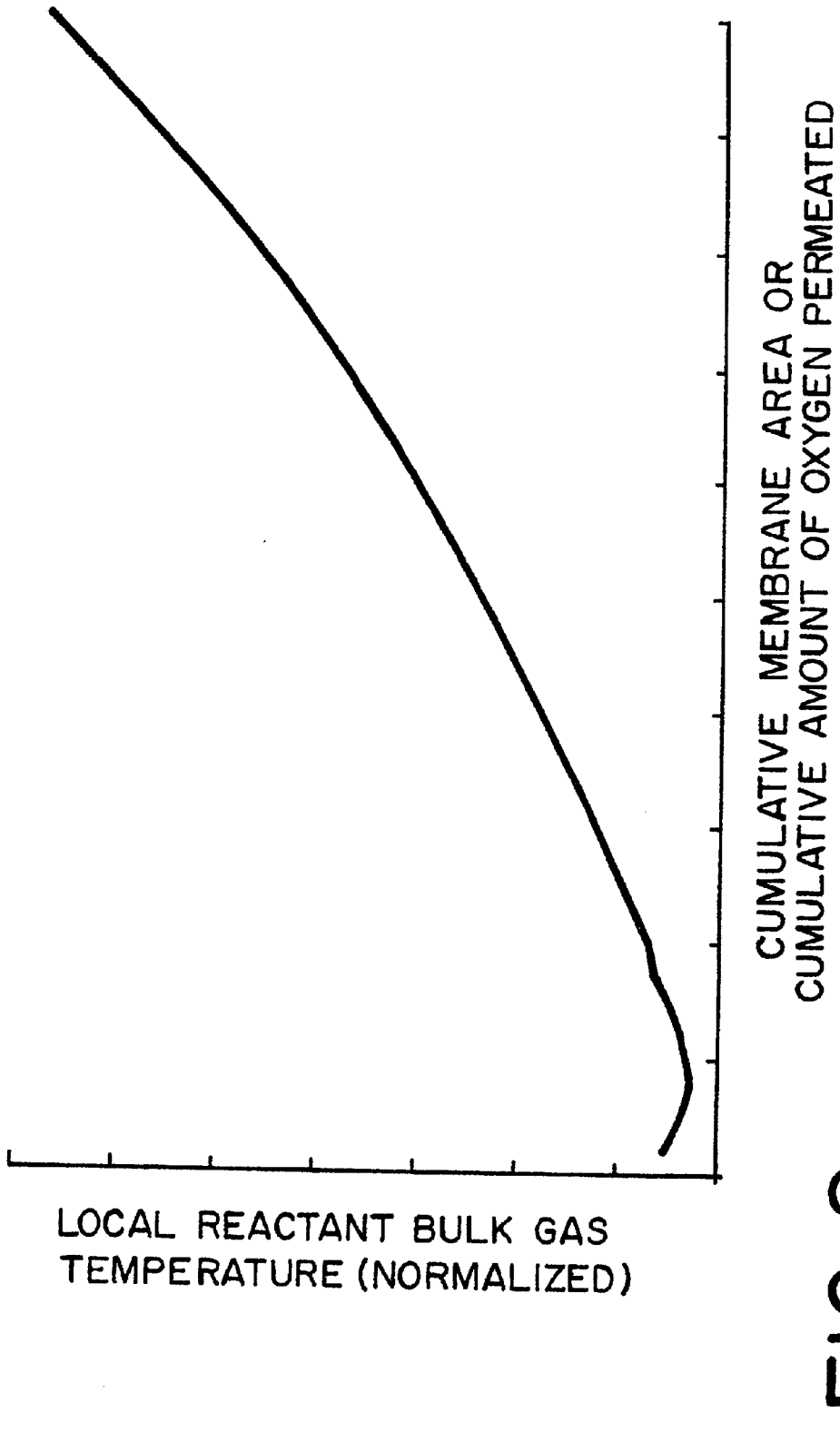
FIG. 2 is a qualitative plot of normalized reactant bulk gas temperature vs. cumulative membrane area or amount of oxygen permeated for a mixed conducting membrane reactor.

When membrane reactor zone 37 is designed such that the reactant gas is substantially at chemical equilibrium at every region in reactant side 45 of membrane reactor zone 37, the bulk gas temperature on the reactant side qualitatively follows a profile as depicted in FIG. 2, which is a representative plot of normalized local reactant gas bulk temperature versus cumulative membrane area, or alternatively, cumulative amount of oxygen permeated. Except for a possible decrease initially, the bulk gas temperature rises smoothly and monotonically. The reason for the possible initial decrease is that if steam or carbon dioxide is present in the feed, and the feed is far from chemical equilibrium, reactions (4) and (5) can take place even in the absence of oxygen flux.

When sufficient membrane area is provided for oxygen permeation, the bulk gas reactant temperature can rise smoothly in relation to cumulative membrane area, theoretically to any temperature up to the adiabatic flame temperature of the overall reactor feed if not affected by heat leak form the membrane reactor. Such potential heat leaks should be minimized with appropriate insulation and reactor design. The outlet temperature of the reactor should be maintained substantially lower than the adiabatic flame temperature, since at this temperature the product gas will contain only carbon dioxide and water because all hydrogen and CO will have been consumed by combustion.

Figure 5:
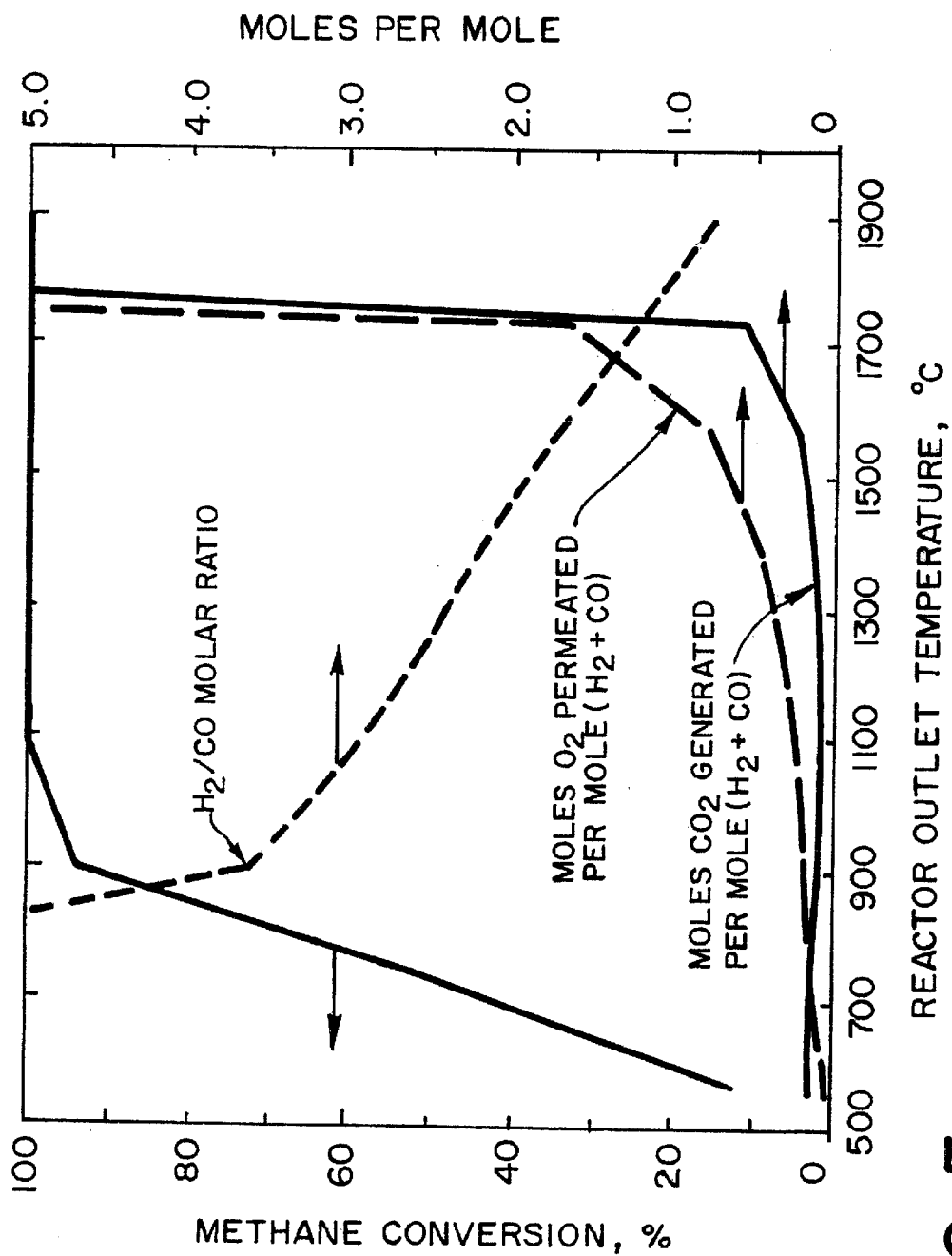
FIG. 5 is a plot of methane conversion, hydrogen/carbon monoxide ratio, moles of oxygen permeated per mole of (hydrogen+CO), and moles of carbon dioxide generated per mole of (hydrogen+CO) vs. reactor outlet temperature for Example 2.

Material limitations of both the reactor and downstream equipment will also restrict the reactor outlet temperature. If the reactor temperature is too low (less than about 1500° F), the conversion of methane would be too low, and the proportion of carbon dioxide relative to carbon monoxide would be high. FIG. 5 illustrates these concepts for a feed with a steam-to-carbon ratio of 1.6 at 250 psig as described in Example 2 below. The carbon dioxide generated per mole of syngas goes through a minimum—at low exit temperatures, the shift reaction favors the presence of carbon dioxide, while at high exit temperatures, the carbon monoxide combustion reaction favors the production of carbon dioxide. In addition, methane conversion drops sharply at low temperatures.

Methane and excess carbon dioxide are generally undesirable in the product gas since these components decrease the partial pressure of the desired components hydrogen and carbon monoxide, increase synthesis gas compression requirements, increase the purge requirements of the downstream synthesis gas consuming process, and cause the production of excess fuel. Excess carbon dioxide production also represents wasteful consumption of oxygen, thereby requiring increased capacity for the feed air blower and increased reactor size unless the carbon dioxide is recycled to extinction. When carbon dioxide is removed from the synthesis gas product, the size of the carbon dioxide removal system is increased; when carbon dioxide is recycled, the carbon dioxide recycle compressor size and power also is increased. The outlet temperature of the reactor thus should be carefully specified, designed, and controlled to minimize undesirable excess carbon dioxide.

Reactions (7), (8), and (9) form elemental carbon which is undesirable in reactor operation. The deposition of carbon, also known as coking, can cause serious problems at the reactor inlet, within the reactor, and in outlet lines downstream of the reactor. Reaction (9) is known as hydrocarbon cracking, particularly the cracking of the higher hydrocarbons such as ethane, propane and butane which are present in natural gas at low but significant concentrations. Cracking is favored by high temperatures, and can occur over hot metallic surfaces, nickel catalyst sites, and acidic sites on refractory materials such as catalyst supports. The reactant inlet piping and the feed region of membrane reaction zone 37 are particularly vulnerable to carbon deposition by this mechanism. The extent of carbon deposition by reaction (9) is controlled by the reactant feed temperature, composition, and constituents, and also by the gas pressure.

The presence of hydrogen or steam in the feed is beneficial for preventing carbon deposition. A mixture of natural gas and steam would typically be limited to a preheat temperature of about 1022° F. (550° C.). A mixture containing methane, steam, and hydrogen, but no hydrocarbons heavier than methane, could be heated to higher temperatures above about 1200° F. (649° C.) depending on the relative concentrations of the components. Once the reactant gas enters reaction zone 37 and begins to react, the heavier hydrocarbons quickly disappear and a substantial amount of hydrogen is formed, so that cracking becomes progressively less likely in the successive zones of the reactor. The gradual permeation of oxygen through mixed conducting membrane 47 Into the reactant is also beneficial in reducing the likelihood of carbon deposition.

The final heating of the reactant gas to the preferred reaction temperature range occurs rapidly within membrane reaction zone 37 because the net reaction therein is exothermic as earlier discussed. Thus an important feature of the present invention is that the reactant gas is not preheated completely to the preferred reaction temperature range above about 1500° F. (816° C.) prior to membrane reaction zone 37, and the reactant gas temperature increases within reaction zone 37 as reaction occurs therein.

As the hot synthesis gas effluent 51 from membrane reaction zone 37 cools in downstream equipment, it will enter a temperature range where carbon deposition by the reaction (8), known as the Boudouard reaction, is favored; the exact temperature depends primarily on the partial pressures of carbon monoxide and carbon dioxide in the stream. The carbon causes severe erosion by corrosion of metallic surfaces of downstream heat transfer equipment, particularly in high temperature metal alloys which contain nickel; this is a phenomenon widely referred to as "metal dusting". Metal dusting is kinetically inhibited below a temperature of 800° F. (427° C.). Thus metal dusting can be avoided by maintaining all metallic surfaces downstream of the reactor at temperatures below 800° F. (427° C.). A process waste heat boiler accomplishes this by maintaining the temperature of the metal tubes close to the temperature of the boiling water. The heat flux and vapor fraction in the boiling water are limited such that high condensing heat transfer coefficients are obtained. Another approach is to quench the synthesis gas effluent 51 with a stream of warm water to below 800° F. (427° C.) prior to any heat exchange.

The total gas pressure at any point in reactant side 45 is about 100–900 psig (6.9–6.2 barg), preferably 200–400 psig (13.8–22.6 barg), and a small pressure drop occurs from inlet 41 to outlet 49. The total gas pressure at any point in oxidant side 43 is in the range of about 1 to about 45 psig (0.069–3.1 barg), preferably less than about 10 psig (0.69 barg), and a small pressure drop occurs from inlet 39 to outlet 55. Thus it is a preferred feature of the present invention that the total pressure at any point in the reactant side of the reaction zone is greater than the total pressure at any point in the oxidant side of the reaction zone, and this is preferred for the reasons discussed below.

Natural gas, typically used as the methane-containing gas for the process as described above, is available by pipeline at industrial locations at 500–1200 psig. It is available at production wellheads at 200–2000 psig, although about 1000 psig is typical. Petroleum refinery offgases are available at 60 psig or higher.

In the reactions discussed above, one mole of methane yields close to one mole of carbon monoxide which is contained in about 3 moles of synthesis gas, which is withdrawn at approximately the pressure of the reactant side of the membrane reactor. The partial oxidation process typically requires about 0.6 moles of oxygen per mole of methane, which needs at a minimum about 3 moles of air at 100% oxygen recovery, and substantially more at lower recovery.

Air is available at ambient pressure. The compressor power required is roughly proportional to the molar flow rate and the logarithm of the pressure ratio. The cost of the compressor is sensitive to the actual volumetric flow rate at inlet conditions—lower inlet pressures can increase the compressor size and cost, even at the same molar flow rate. Compression ratios less than about 3 generally need only a single stage of compression; higher ratios need additional stages with intercoolers.

The following general conclusions can be made based on the preceding discussion:

a) it is preferable to compress the methane-containing gas rather than air or synthesis gas product, since the methane-containing gas flow rate is lowest and compression will require minimal power; in some cases, no compression will be required;

b) compressing product synthesis gas is less desirable primarily because it is produced at approximately three times the flow rate of the methane-containing gas feed; and c) compressing air is the least desirable since it is required at the highest flow rate and is available at ambient pressure.

Thus the membrane reactor should be designed to operate with the maximum pressure differential between the reactant side and the oxidant side subject to reasonable mechanical and fabrication constraints. The oxidant side should be operated as close to ambient pressure as possible sufficient to overcome the total system pressure drop, the membrane reactor should be designed to minimize the pressure drop therein, and a fan or blower preferably is used to supply air to the reactor oxidant preparation system.

As the oxidant and reactant gases flow through membrane reaction zone 37, oxygen permeates mixed conducting membrane 47 and reactions (1) through (6) proceed in reactant side 45 to yield the desired synthesis gas product. Preferably a reforming catalyst is applied to at least a portion of the reactant side surface of mixed conducting membrane 47 to promote the desired reactions. Alternatively, reforming catalyst in granular or pellet form can be packed into reactant side 45 adjacent to the surface of mixed conducting membrane 47. Catalysts for this purpose are well known in the art.

The addition of steam 29 to reactant gas 27 is highly desirable to moderate temperature, prevent carbon deposition or gasify any carbon which may be formed, and serve as a reactant in reactant side 45. Steam also minimizes residual methane in synthesis gas product 51. The steam to carbon ratio preferably is between 0.5 and 5. By using a steam to carbon ratio of 3.5, for example, unreacted methane in the synthesis gas product can be reduced to approximately 0.5 vol % at 1650° F. (899° C.) at 250 psig (17.2 barg). Without the addition of steam, unreacted methane of 0.5 vol % would be achieved only at temperatures approaching 2400° F. (1315° C.). Since the addition of steam does increase the carbon dioxide/carbon monoxide ratio and decrease the energy efficiency, the amount of added steam should be specified carefully.

Hot synthesis gas product 51 is withdrawn at outlet 49 of membrane reaction zone 37 at a temperature of greater than about 1500° F. (816° C.). Synthesis gas product 51 contains hydrogen and carbon monoxide with a hydrogen to carbon monoxide molar ratio of 1 to 6. Oxygen-depleted oxidant 53 is withdrawn at outlet 55 at a temperature below that of product synthesis gas 51. With oxidant and reactant in cocurrent flow, the temperature of oxygen-depleted oxidant 53 can approach to within 9 to 180° F. (5–100° C.) of the temperature of product synthesis gas 51. The temperature rises in a controlled manner from the inlet to the outlet of membrane reaction zone 37 because the combination of individual endothermic and exothermic reactions which occur therein are net exothermic as earlier described.

Preferably at least about 90% of the oxygen in heated oxidant 17 permeates mixed conducting membrane 47, so that oxygen-depleted oxidant 53 generally contains less than about 2 vol % oxygen. A high oxygen recovery will minimize the power requirements of compressor 3 because a minimum volume of gas is compressed.

Mixed conducting membrane reaction zone 37 as described above is presented in a simplified format for explanation of the membrane reactor process features. In actual practice, mixed conducting membrane reaction zone 37 comprises one or more reactor modules, each of which contains multiple membranes with multiple oxidant and reactant channels or cells wherein a single reaction cell is characterized by oxidant side 43, reactant side 45, and mixed conducting membrane 47 of FIG. 1. Numerous designs of membrane reactor modules for this purpose have been described in the art as summarized in the background information presented above, and these designs include both cocurrent flow and crossflow modules utilizing tubular, corrugated plate, and monolith configurations.

Referring again to FIG. 1, hot oxygen-depleted oxidant 53 is introduced into heat transfer zone 9 and exits therefrom as cooled flue gas 57. A major portion of the heat content of hot oxygen-depleted oxidant 53 is transferred via heat exchangers 7, 23, and 33 to heat process streams as earlier described. Heat transfer zone 9 can be similar to flue gas heat recovery systems used in conventional steam-methane reforming.

Hot synthesis gas product 51 is cooled rapidly to a temperature below 800° F. (427° C.) against boiling water by indirect heat transfer in waste heat boiler 59 and is further cooled against other process streams (later defined) in one or more heat exchangers 61, 63, 65, and 67. Cooled synthesis gas 69 passes into phase separator 71 from which condensed water 73 is withdrawn and combined with boiler feedwater makeup 75. The combined water stream is heated in heat exchanger 65 to yield preheated boiler feedwater 77 which is degasified and deaerated (not shown) for use in waste heat boiler 59. Alternatively, if the process makes excess water, a portion of condensate 73 is preheated in heat exchanger 65 and the remainder is discharged as wastewater (not shown). Depending on the end use of the synthesis gas, cooled and dewatered synthesis gas 79 optionally is treated in carbon dioxide removal system 81 using known methods to remove some or all of the carbon dioxide contained in the raw synthesis gas. Processed synthesis gas 85 is compressed as required in compressor 87 to yield final synthesis gas product 89.

Optionally, a portion of carbon dioxide 83 removed from the raw synthesis gas is compressed in compressor 91 to provide carbon dioxide recycle 31 as earlier described. Optionally, a portion 93 of synthesis gas 85 is separated using known methods such as pressure swing adsorption system 95 to recover hydrogen 21 which is used for hydrogenation of feed gas 19 as earlier described. Waste gas 97 from pressure swing adsorption system 95 can be combined with fuel 13 to provide fuel 14 in burner 15 for heating oxygen-containing gas 11.

Figure 3:
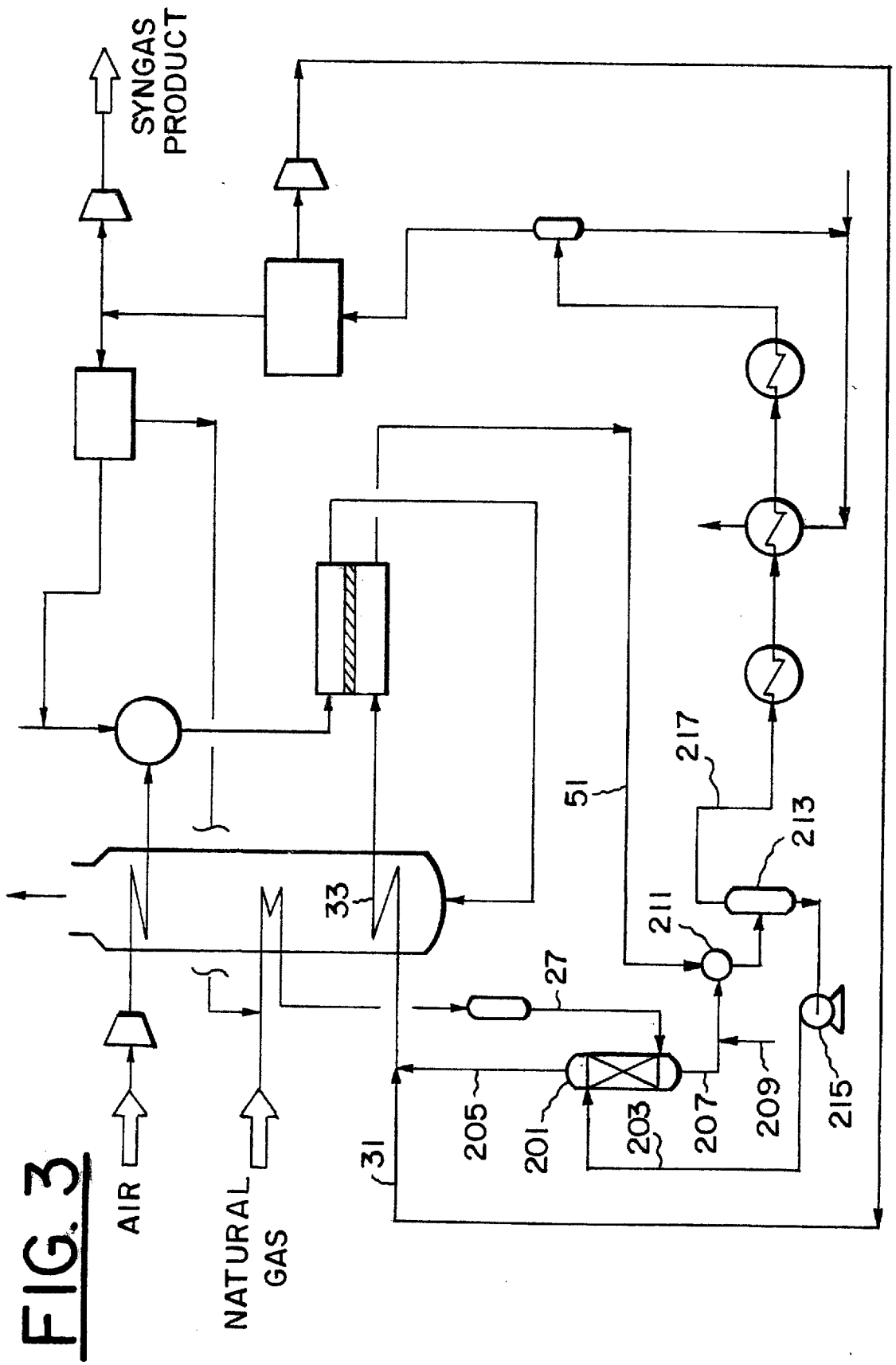
FIG. 3 is a process flow diagram of an alternative embodiment of the process of the present invention.

In an alternative embodiment of the invention, steam 29 is not utilized and instead treated methane-containing gas 27 is directly saturated with water vapor before final heating and introduction into mixed conducting membrane reaction zone 37. This alternative is illustrated in FIG. 3 in which treated methane-containing gas 27 is introduced into saturator 201 where it is contacted with hot water 203 to achieve a water to carbon molar ratio between about 0.5 to about 5. Saturator 201 can be any type of gas-liquid contactor such as a spray tower, packed tower, or trayed column. Methane-containing gas 205, now containing the required amount of water, optionally is combined with carbon dioxide recycle 31 and passes to heat exchanger 33 as earlier described. Saturator bottoms 207 is combined with quench makeup water 209 and quenches hot synthesis gas product 51 in quench zone 211. Quenched gas and liquid water pass into separator 213 and water withdrawn therefrom is recirculated by pump 215 to saturator 201. Quenched synthesis gas 217 is further processed as earlier described.

In the embodiment of FIG. 3, latent heat for saturating methane-containing gas 27 with water is obtained from hot synthesis gas product 51 using water as a heat shuttle, and no external steam is required. This embodiment is useful where export steam has no value or when additional steam is not required at other locations in the synthesis gas process. Thus boiler 59 of FIG. 1 would not be used to raise steam, and instead the embodiment of FIG. 3 would be preferred.

Figure 4:
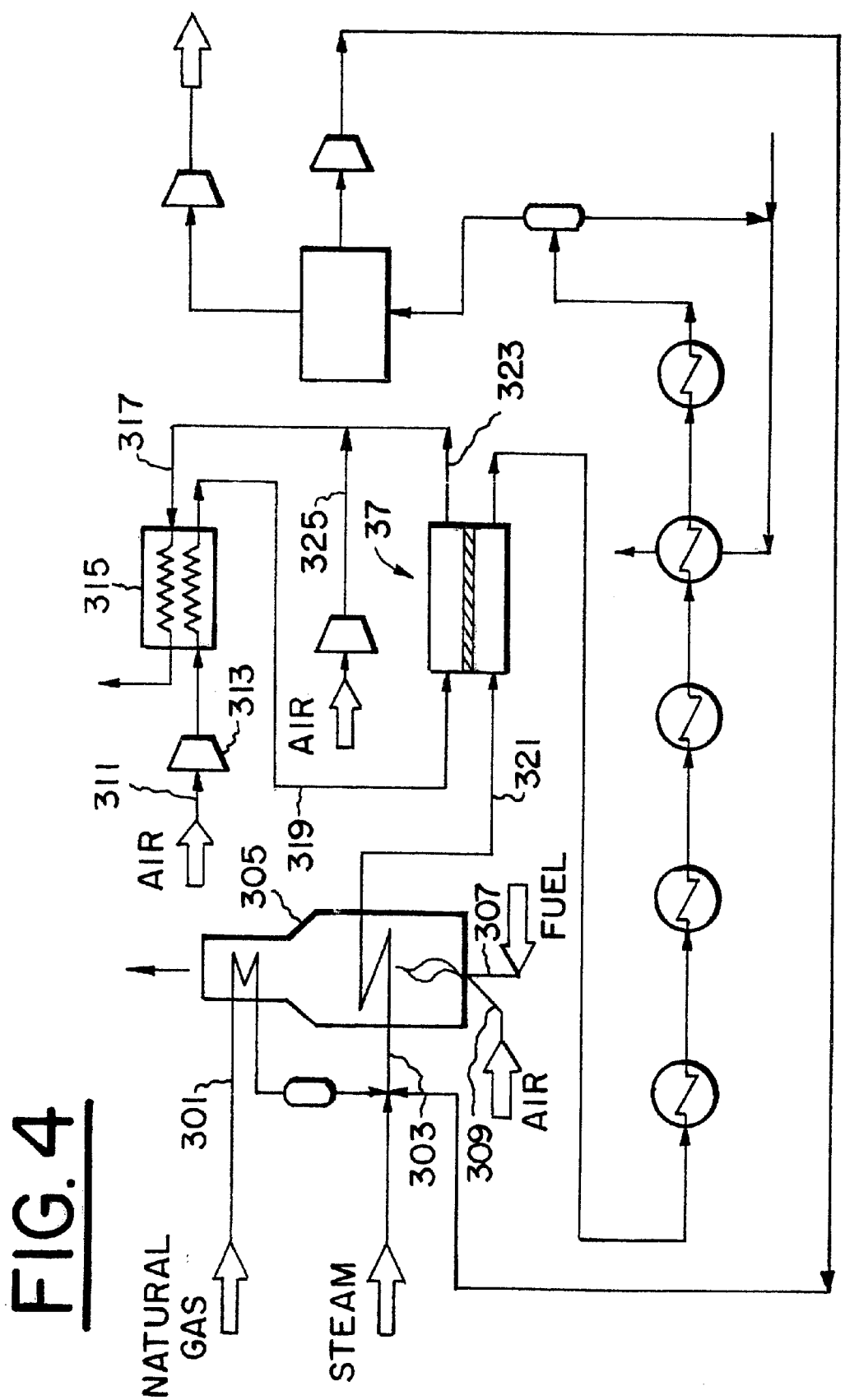
FIG. 4 is a process flow diagram of another alternative embodiment of the process of the present invention.

Another embodiment of the invention is shown in FIG. 4 in which the methane containing feed gas and the oxygen-containing gas are heated in an alternative manner. In this embodiment, methane-containing gas 301 and reactant gas 303 are heated in process furnace 305 fired with fuel 307 and combustion air 309 as commonly practiced in autothermal reforming and partial oxidation synthesis gas processes. Oxygen-containing gas 311, preferably air, is pressurized in compressor 313 and heated in gas-gas heat exchanger 315 against hot gas 317 (later defined). Heated oxidant 319 and heated reactant gas 321 pass into mixed conducting membrane reaction zone 37 and synthesis gas is formed as earlier described. Hot oxygen-depleted oxidant 323 optionally is combined with cool fresh air 325 to yield hot compressed gas 317. Cooling hot oxygen-depleted oxidant 323 with cool fresh air 325 allows the use of less expensive materials in heat exchanger 315.

The present invention thus includes two preferred features in the operation of a mixed conducting membrane reactor module for synthesis gas generation. First, the temperature of hot synthesis gas product 51 as withdrawn at outlet 49 of membrane reaction zone 37 is greater than the temperature of heated reactant gas 35 at reactant inlet 41 of reactant side 45 of membrane reaction zone 37. Preferably the temperature of reactant gas 35 is maintained below a threshold temperature which depends upon the constituents in the reactant feed as well as design and operational factors. The maximum value of this threshold temperature is about 1400° F. (760° C.), but the preferred threshold temperature may be lower In certain situations. For a typical natural gas stream in admixture with steam, for example, this threshold temperature preferably is about 1022° F. (550° C.). Maintaining the reactant gas feed temperatures below the appropriate threshold temperatures will prevent or minimize carbon formation by reaction (9) in the inlet piping, distribution manifold, and inlet region of membrane reaction zone 37. Maintaining this inlet temperature below about 1200° F. (635° C.) has the added practical advantage that gas inlet piping to the reactor module can be fabricated from unlined low-alloy metal rather than refractory-lined metal, high-alloy metal, or ceramic material. This is a desirable design feature because unlined metal inlet piping can compensate for thermal expansion and contraction of the membrane reactor module components more readily than refractory-lined inlet piping. Unlined metal inlet piping can be coiled to form "pigtails" which readily compensate for thermal effects at the reactor inlet. Thus the reactant gas temperature is maintained below the threshold temperature and is not preheated to the preferred reaction temperature range (greater than about 1500° F. (815° C.)) prior to membrane reaction zone 37. Any heating of the reactant gas above the reactant inlet temperature of 950 to 1400° F. (510 to 760° C.) thus occurs with simultaneous chemical reaction within membrane reaction zone 37.

The second preferred feature of the invention is that the gas pressure at any point on the oxidant side of membrane reaction zone 37 is less than the pressure at any point on the reactant side of zone 37. This is economically preferable because the synthesis gas product normally is required at an elevated pressure, and the reactant, typically natural gas, usually is available at an elevated pressure and requires little or no compression before preheating. The pressure of the oxidant gas, preferably air, need only be sufficient to compensate for pressure drop through the membrane reaction zone and associated piping and equipment. A high pressure is not required to increase oxygen partial pressure because rapid oxygen consumption in the reactant side of the membrane reaction zone provides sufficient oxygen partial pressure difference across the membrane. Also, as described above, at least about 90% of the oxygen in heated oxidant 17 (preferably air) permeates mixed conducting membrane 47, which minimizes the required flow rate of oxidant gas. Thus by minimizing the required pressure and flow rate of the oxidant gas, the power requirement for compressor 3 is minimized. In addition, because of the lower pressure requirement a blower can be used for compressor 3, thus further reducing capital cost.

EXAMPLE 1

Synthesis gas production using the process of FIG. 1 was modeled by heat and material balance calculations to illustrate one embodiment of the present invention. Air 1 is compressed in blower 3 to 10 psig (0.69 barg), preheated in heat exchanger 7 and burner 15, and the resulting combustion gas 17 at 1200° F. (649° C.) with an oxygen concentration of 17 vol % at a flow rate of 22420 lbmoles/hr (10170 kgmoles/hr) is introduced into oxidant side 43 of membrane reaction zone 37. Reactant mixture 27 at 285 psig (19.7 barg) containing 80 vol % methane and 20 vol % hydrogen at a flow rate of 6772 lbmoles/hr (3072kgmoles/hr) is combined with 2701 lbmoles/hr (1225 kgmoles/hr) of carbon dioxide 31 and 8668 lbmoles/hr (3932kgmoles/hr) of steam 29 to give a steam/carbon molar ratio of 1.6. Hydrogenation reactor 25 is not required and PSA system 95 is not used. The resulting stream is heated in heat exchanger 33, and heated reactant 35 at 1200° F. (649° C.) is introduced into reactant side 45 of membrane reaction zone 37. Oxygen permeates mixed conducting membrane 47 and reacts with the reactant gas components to form synthesis gas as earlier described.

Oxygen-depleted air 53 containing 2 vol % oxygen is withdrawn at 1742° F. (950° C.), cooled in heat exchange zone 9, and rejected as flue gas 57 at 289° F. (143° C.). Synthesis gas product 51 is withdrawn at 1742° F. (950° C.) and cools to 750° F. (399° C.) in waste heat boiler 59. After further cooling to 100° F.(38° C.) in various heat exchange steps earlier described, and after dewatering, 90% of synthesis gas 79 is processed in MEA scrubber 81 to remove carbon dioxide 83, which is compressed to 285 psig (19.7 barg), recycled as stream 31, and combined with reactant 27. The remaining 10% of the synthesis gas (not shown) is combined with synthesis gas 85 and compressed to 600 psig (41.4 barg) to provide final synthesis gas product 89 having a hydrogen/carbon monoxide molar ration of 2.15 at a flow rate of 16249 lbmoles/hr (7370 kgmoles/hr), The product synthesis gas contains 1.9 vol % carbon dioxide and 0.5 vol % methane.

EXAMPLE 2

A mixed conducting membrane reactor with a cocurrent flow configuration was simulated by equilibrium, heat, and material balance calculations to illustrate the performance of the reactor as a function of outlet temperature. The reactor is operated in a cocurrent mode in which an air-fuel combustion product is the oxidant gas and a methane-hydrogen-steam mixture as the reactant gas having a methane/hydrogen molar ratio of 4.0 and a steam/carbon molar ratio of 1.6 enter the reactor. The inlet temperature for both air and reactant is 1200° F. (649° C.), the air feed pressure is <10 psig (0.7 barg), and the synthesis gas outlet pressure is 250 psig (17.3 barg). The mixed conducting membrane can be any membrane selectively permeable to oxygen at these temperatures. All permeated oxygen is assumed to be consumed and synthesis gas product 49 is assumed to be in reforming and shift equilibrium. Equilibrium constants for the steam reforming and shift reactions are known in the art (see for example the brochure entitled "Physical and Thermodynamic Properties of Elements and Compounds" published by United Catalysts, Inc. or Table 2 in the textbook entitled "Catalytic Steam Reforming" by Jens R. Rostrup-Nielsen, Springer-Verlag, 1984). Published equilibrium constants were curve-fit and used in the simulation calculations.

The oxygen concentration in the oxygen-depleted oxidant gas from the reactor is 2 vol %. It is assumed that the oxygen-depleted oxidant gas outlet temperature and reactant gas outlet temperature are essentially equal. It is also assumed that no heat loss occurs from the reactor such that adiabatic operation is realized. Heat and material balance calculations were carried out at selected outlet temperatures and the results are shown in FIG. 5 which gives methane conversion, hydrogen/carbon monoxide ratio, oxygen permeation, and carbon dioxide production as a function of reactor outlet temperature. Temperatures above about 2732° F. (1500° C.) are for illustration only, and materials limitations would make higher temperatures impractical.

It is seen that methane conversion increases rapidly and is complete at just above 1000° C. The hydrogen/carbon monoxide ratio decreases as temperature increases, which is dictated by the trend of the reverse water gas shift reaction equilibrium. The cumulative amount of oxygen permeated increases with temperature, and the temperature increases because of the net exothermic chemical reactions occurring in the reaction zone which consume the permeated oxygen. Carbon dioxide production first decreases with temperature due to the reverse shift reaction equilibrium; after a minimum at about 1100° C., it increases slowly and then more rapidly. The rapid increase in carbon dioxide production at higher temperatures occurs because essentially all methane has been converted, and the product hydrogen and carbon monoxide begin to combust as additional oxygen permeates through the membrane. This continues until all combustible species are consumed and the temperature attains the adiabatic flame temperature (not shown In FIG. 5). The adiabatic flame temperature is a characteristic of the composite of reactant feed 41 and oxidant feed 39.

These results illustrate the use of controlled oxygen permeation and high oxygen recovery to produce synthesis gas wherein the membrane reactor is operated with the reactant side pressure greater than the oxidant (air) side pressure.

EXAMPLE 3

Figure 6:
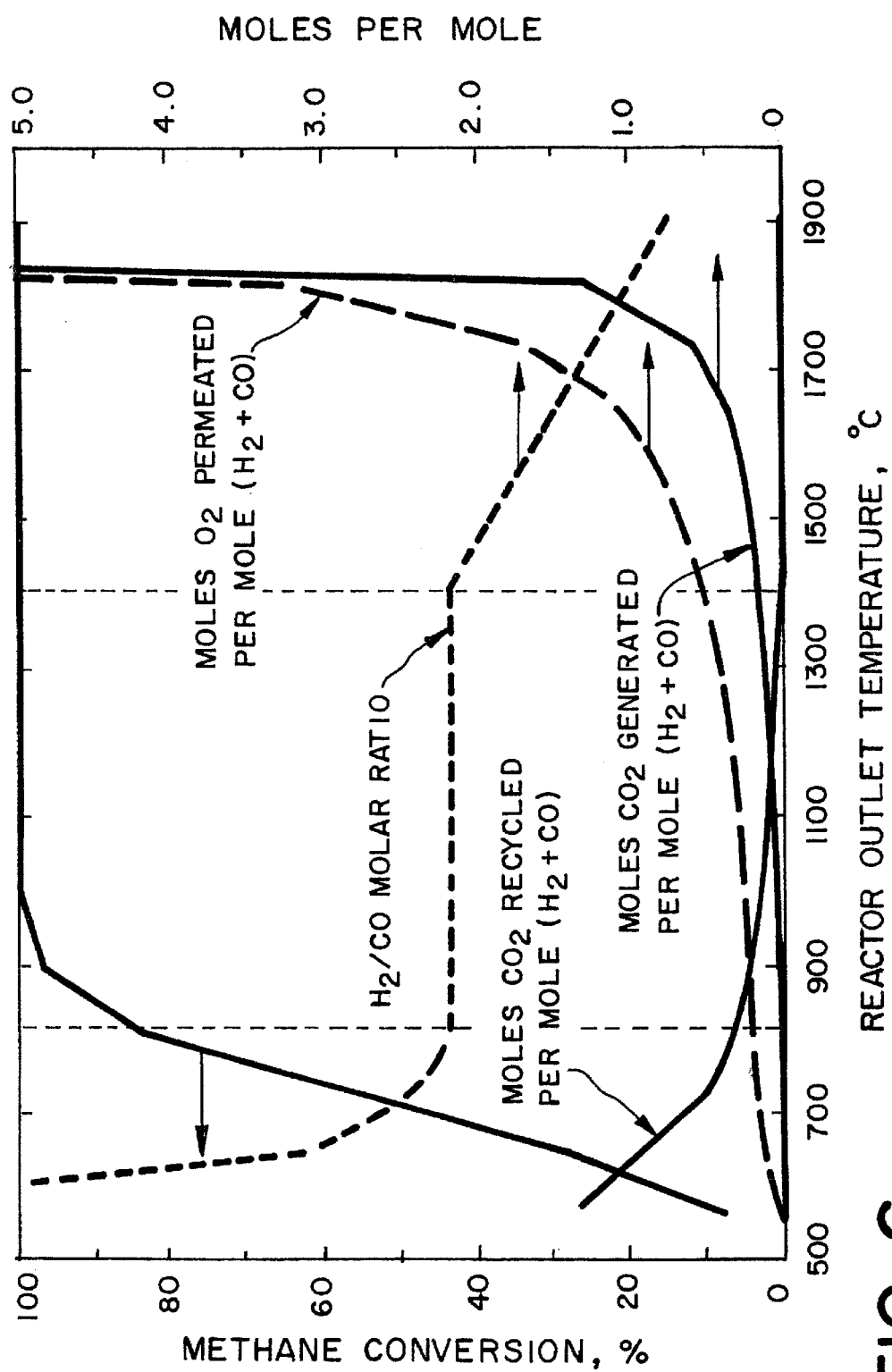
FIG. 6 is a plot of methane conversion, hydrogen/CO ratio, moles oxygen permeated per mole of (hydrogen+CO), moles of carbon dioxide generated per mole of (hydrogen+CO), and moles of carbon dioxide recycled per mole of (hydrogen+CO) vs. reactor outlet temperature for Example 3.

This Example illustrates operation of the membrane reactor at a constant hydrogen/carbon monoxide ratio with carbon dioxide recycle. All other conditions, assumptions, and calculation methods are identical to those of Example 2. Heat and material balances were carried out at selected outlet temperatures and the results are shown in FIG. 6 which gives methane conversion, hydrogen/carbon monoxide ratio, oxygen permeation, carbon dioxide recycle, and carbon dioxide generation as a function of reactor outlet temperature.

Carbon dioxide is removed from the synthesis gas product and recycled into the reactor feed, and the recycled amount is adjusted to the extent possible to yield a $H_2/CO$ molar ratio of 2.15. This synthesis gas is a suitable feed, for example, for the Fischer-Tropsch process for the synthesis of higher hydrocarbons. A controlled molar ratio of 2.15 is possible at reactor exit temperatures between 815° C. and 1399° C. Below 815° C., the $H_2/CO$ molar ratio cannot be reduced to 2.15 even if all the carbon dioxide is recycled. Above 1399° C., even without carbon dioxide recycle, the $H_2/CO$ ratio cannot be increased to 2.15. The amount of carbon dioxide recycled continuously declines with increasing temperature. Removing and recycling carbon dioxide is expensive; when it is desirable to minimize or eliminate carbon dioxide recycle, reactor exit temperatures will increase to the 1300–1400° C. range. However, the oxygen permeation requirement also increases monotonically, since an increasing amount of carbon dioxide is generated in the reactor, at the expense of carbon monoxide production.

Any excess of generated carbon dioxide which is not recycled will remain in the product syngas, which is also undesirable, since this is a waste of permeated oxygen and also of carbon atoms in the methane containing feed. In addition, it increases purge requirements of the downstream processing section, and it increases overall plant energy export as steam or fuel gas. Thus the optimal reactor outlet temperature is likely to be somewhat lower than 1300° C. Methane conversion is complete at 1000° C., as in Example 2. Below about 816° C. a significant amount of unconverted methane would remain in the syngas product, which generally has the same disadvantages as described above for carbon dioxide in the synthesis gas product. Thus the optimal reactor outlet temperature, for this particular case with a S/C of 1.6, is between about 816° C. and 1300° C. Different steam/carbon ratios will have different optimal ranges—higher S/C ratios would generally shift the desired temperature into a lower range.

The present invention thus discloses the production of synthesis gas from methane-containing feed gas using a mixed conducting membrane reactor operating at preferred conditions of temperature and pressure. Two preferred features are described in the operation of a mixed conducting membrane reactor module for synthesis gas generation. First, the temperature of the hot synthesis gas product as withdrawn at the outlet of the membrane reaction zone is greater than the temperature of heated reactant feed gas at the reactant inlet of the membrane reaction zone. Preferably the reactant gas feed temperature is maintained below a threshold temperature which depends upon the constituents in the reactant feed as well as design and operational factors. The maximum value of this threshold temperature is about 1400° F. (760° C.), but the preferred threshold temperature may be lower in certain situations as earlier described. The threshold temperature is less than the maximum temperature in the reactant side of the reaction zone. Maintaining the reactant gas feed temperature below the threshold temperature prevents carbon deposition and allows the use of unlined metal piping and manifolding at the reactor inlet.

The second preferred feature of the invention is that the gas pressure on the oxidant side of the membrane reaction zone is less than the gas pressure on the reactant side. This is economically preferable because the synthesis gas product normally is required at an elevated pressure, and the reactant, typically natural gas, usually is available at an elevated pressure and requires little or no compression before preheating. The pressure of the oxidant gas, preferably air, need only be sufficient to compensate for pressure drop through the membrane reaction zone and associated piping and equipment A high pressure is not required to increase oxygen partial pressure because rapid oxygen consumption in the reactant side of the membrane reaction zone provides sufficient oxygen partial pressure difference across the membrane. Thus by minimizing the required pressure and flow rate of the oxidant gas, the power requirement for compression is minimized. In addition, because of the lower pressure requirement, a blower can be used instead of a compressor and this reduces capital cost.

The essential characteristics of the present invention are described completely in the foregoing disclosure. One skilled in the art can understand the invention and make various modifications without departing from the basic spirit of the invention, and without deviating from the scope and equivalents of the claims which follow.

What is claimed is:

1. A method for producing synthesis gas containing hydrogen and carbon monoxide which comprises:

(a) providing a reaction zone having an oxidant side and a reactant side which are separated by a solid mixed conducting membrane;

(b) heating an oxygen-containing oxidant gas feed to yield a heated oxidant gas feed and introducing the heated oxidant gas feed into the oxidant side of the reaction zone at an oxidant gas feed temperature and an oxidant gas feed pressure;

(c) heating a methane-containing reactant gas to yield a heated reactant gas feed and introducing the heated reactant gas feed into the reactant side of the reaction zone at a reactant gas feed temperature and a reactant gas feed pressure;

(d) permeating oxygen from the oxidant side of the reaction zone through the mixed conducting membrane to the reactant side of the reaction zone and reacting the oxygen with the heated reactant gas feed to form at least hydrogen and carbon monoxide;

(e) withdrawing a synthesis gas product comprising at least hydrogen and carbon monoxide from the reactant side of the reaction zone at a product gas outlet temperature; and (f) maintaining the product gas outlet temperature above the reactant gas feed temperature;

wherein the total pressure at any point in the reactant side of the reaction zone is greater than the total pressure at any point in the oxidant side of the reaction zone.

* * * * *